United States Patent Office 3,373,203
Patented Mar. 12, 1968

3,373,203
PREPARATION OF DECAHYDRODECABORATES
Joseph M. Makhlouf, Mars, and William V. Hough, Gibsonia, Pa., assignors to Callery Chemical Company, Pittsburgh, Pa., a corporation of Pennsylvania
No Drawing. Filed Sept. 14, 1966, Ser. No. 579,220
6 Claims. (Cl. 260—567.6)

This invention relates to a new method of preparing decahydrodecaborates and more particularly to their preparation by the thermal decomposition of octahydrotriborates.

Meutterties and Knoth, Chemical and Engineering News, May 9, 1966, pages 88 to 98, in reviewing the extensive chemistry of the polyhedral boranes, which are of unusual interest because of their aromatic character, note the particular importance of the decahydrodecaborate (−2) ion, $B_{10}H_{10}^{-2}$. Heretofore, decahydrodecaborates have been prepared from decaborane, $B_{10}H_{14}$, which is an extremely expensive starting material.

It is therefore an object of this invention to provide a simple and direct method of preparing compounds containing decahydrodecaborate (−2) ion.

Another object of this invention is to provide a method of preparing decahydrodecaborate salts by pyrolysis of octahydrotriborate salts. Other objects will be apparent from the following description and claims.

In accordance with this invention, potassium octahydrotriborate, $KB_3H_8$, cesium octahydrotriborate, $CsB_3H_8$, tetramethylammonium octahydrotriborate, $$(CH_3)_4NB_3H_8$$

or tetraethylammonium octahydrotriborate, $$(C_2H_5)_4NB_3H_8$$

are pyrolyzed, or heated to a temperature at which they thermally decompose, to produce the corresponding decahydrodecaborate salt.

Tetramethylammonium octahydrotriborate thermally decomposes according to the equation:

(1) $9(CH_3)_4NB_3H_8 \xrightarrow{\Delta} [(CH_3)_9N]_2B_{10}H_{10}$
$+ [(CH_3)_4N]B_{12}H_{12} + 5(CH_3)_3NBH_3 + 5CH_4 + 15H$ Potassium and cesium octahydrotriborates decompose primarily according to the equation:

(2) $4MB_3H_8 \xrightarrow{\Delta} M_2B_{10}H_{10} + 2MBH_4 + 4H_2$ where M represents K or $C_s$, although pyrolytic reactions giving other polyhedral boron compounds also occur simultaneously to some extent.

Tetraethylammonium octahydrotriborate is a much preferred starting material as it decomposes, apparently by a different mechanism, to give substantially quantitative recovery of the boron as the decahydrodecaborate (−2) ion according to the equation:

(3) $10(C_2H_5)_4NB_3H_8 \xrightarrow{\Delta} 3[C_2H_5)_4N]_2B_{10}H_{10}$
$+ 8(C_2H_5)_3N + 8C_2H_6 + 11H_2$ In the practice of this invention, the octahydrotriborate is heated to at least its decomposition temperature, about 160–165° C. for the potassium and cesium salts and about 180–185° C. for the tetramethylammonium and tetraethylammonium salts, under an inert, non-oxidizing atmosphere, suitably nitrogen, argon or other noble gas. Higher temperatures may be used but it is preferred to use temperatures below about 220° C. because at higher temperatures the pyrolysis reaction produces higher proportions of dodecahydrodecaborate (−2). The solid residue remaining on removal of the volatile reaction products is substantially pure decahydrodecaborate (−2) salt when using tetraethylammonium octahydrotriborate, or when using other octahydroborates, a mixture of decahydrodecaborate (−2) salt with other solid pyrolysis products from which it is separated by conventional means.

The following examples are illustrative of this invention:

Example I 9.16 g. (53.64 millimols) of tetraethylammonium octahydrotriborate was placed under a nitrogen atmosphere in a 250 cc. steel cylinder provided with a vent discharging through a mercury trap and a wet test meter. The temperature was slowly raised to and maintained at 185° for about 20 hours, until off-gasing ceased, at which time the vent was closed and the cylinder was cooled to room temperature. About 3.8 liters (STP) of ethane or hydrogen were vented during the pyrolysis compared to 3.62 liters according to Equation 3, and 5.88 g. (96.5% yield according to Equation 3) of solid tetraethylammonium decahydrodecaborate was recovered for the reactor. Triethylamine product was distilled from the reactor during the pyrolysis and collected in the mercury bubbler. Chemical elemental analysis of the product was 29.7% B, 48.72% C, 14.1% H and 7.27% N, compared to the theoretical elemental content for $[(C_2H_5)_4N]_2B_{10}H_{10}$ of 28.54% B, 50.68% C, 13.3% H and 7.39% N. A portion of this pyrolysis product was dissolved in acetonitrile, and about 2–3% by weight of the pyrolysis product was insoluble $[(C_2H_5)_4N]_2B_{12}H_{12}$ that was filtered out. Tetramethylammonium octahydrotriborate was added to the solution to form tetraethylammonium decahydrodecaborate by the metathetic reaction:

$$[(C_2H_5)_4N]_2B_{10}H_{10} + 2(CH_3)_4NB_3H_8 \xrightarrow{CH_3CN} [(CH_3)_4N]_2B_{10}H_{10} + 2(C_2H_5)_4NB_3H_8$$

The infrared spectrum of the tetramethylammonium decahydrodecaborate was identical to that of an authentic tetramethylammonium decahydrodecaborate prepared by the method of Hawthorne and Pitochelli, J. Am. Chem. Soc., vol. 81, 5519 (1958).

The $B^{11}$ NMR spectrum of the solid pyrolysis product dissolved in acetonitrile, showed the expected two doublets. The high field doubet with a coupling constant of 128 cps., centered at 52 p.p.m., $(CH_3O)_3B$ as ref. This corresponds with $B^{11}$ NMR values for the $B_{10}H_{10}^{-2}$ anion, reported by E. L. Meutterties et al. Inorg. Chem., vol. 3, 444 (1964).

Example II

Example I was repeated except that 5.36 g. (46.7 millimols) of tetramethylammonium octahydrotriborate was used in place of the tetraethylammonium octahydrotriborate. The measured off-gas of hydrogen and methane was 2.58 liters as compared to 2.60 liters theoretical from Equation 1, and 4.68 g. of solid material was recovered from the reactor. Extraction of the solid product with methylene chloride yelded 1.68 grams of $(CH_3)_3NBH_3$ as the soluble fraction. The methylene insoluble fraction was extracted with water to yield an 1.33 g. of water insoluble $[(CH_3)_4N]_2B_{12}H_{12}$ and 1.39 g. of water soluble $[(CH_3)_4N]_2B_{10}H_{10}$, a 95.5% yield based on Equation 1.

Example III

Example I was repeated except that 8.9 g. (112.0 millimols) of $KB_3H_8$ was used in place of the tetraethylammonium octahydrotriborate. The measured hydrogen off-gas was 4.55 liters as compared to a theoretical 4.9 liters according to Equation 2. The residual solids, 8.23 grams, containing sodium decahydrodecaborate, was dissolved in an aqueous solution of $(CH_3)_4NCl$, leaving undissolved $(CH_3)_4NBH_4$ and a small amount of insoluble $(CH_3)_4NB_{11}H_{14}$ identified by infrared spectrum analysis. The water soluble material was primarily $[(CH_3)_4N]_2B_{10}H_{10}$.

*Example IV*

Example I was repeated except that 5.02 grams (29 millimols) of $CsB_3H_8$ was used in place of the tetraethylammonium octahydrotriborate and 1.26 liters of hydrogen was evolved during the pyrolysis compared to theoretical of 1.27 liters according to Equation 2. The infrared absorption of the solid product, 4.95 grams, was substantially the same as that of the solid product from Example III; the absorption bands are at 2488, 2278, 2225 (shoulder), 1115, 1040–1025 (medium) and 730 cm.$^{-1}$ (broad and shallow).

According to the provisions of the patent statutes, we have explained the principle and mode of practice of our invention and have described what we now consider to represent its best embodiment. However, we desire to have it understood that, within the scope of the appended claims, the invention may be practiced otherwise than as specifically described.

We claim:

1. A method of preparing a decahydrodecaborate salt comprising thermally decomposing under an inert atmosphere an octahydrotriborate of the formula $MB_3H_8$, where M is potassium, cesium, tetramethylammonium, or tetraethylammonium and recovering the decahydrodecaborate salt.

2. A method according to claim 1 in which the temperature is below about 220° C.

3. A method according to claim 1 in which the octahydrotriborate is tetraethylammonium octahydrotriborate.

4. A method according to claim 3 in which the temperature is below about 220° C.

5. A method according to claim 4 in which the temperature is about 185° C.

6. A method according to claim 1 in which the octahydrotriborate is tetramethylammonium octahydrotriborate and the pyrolysis product contains tetramethylammonium decahydrodecaborate, leaching said pyrolysis product with methylene chloride, and extracting the resultant solid residue with water to recover an aqueous solution of tetramethylammonium decahydrodecaborate.

No references cited.

CHARLES B. PARKER, *Primary Examiner.*

S. T. LAWRENCE III, *Assistant Examiner.*